United States Patent [19]

Fukuda

[11] Patent Number: 5,686,778
[45] Date of Patent: Nov. 11, 1997

[54] MOVEMENT DEVICE UTILIZING ELECTROMECHANICAL CONVERSION ELEMENTS AND CONTROL METHOD THEREFORE

[75] Inventor: Taiichiroh Fukuda, Kawasaki, Japan

[73] Assignee: Nikon Corporation, Tokyo, Japan

[21] Appl. No.: 743,136

[22] Filed: Nov. 4, 1996

Related U.S. Application Data

[63] Continuation of Ser. No. 506,855, Jul. 25, 1995, abandoned.

[30] Foreign Application Priority Data

Jul. 25, 1994 [JP] Japan ................................. 6-172508

[51] Int. Cl.$^6$ ........................................................ H02N 2/00
[52] U.S. Cl. ............................................................... 310/328
[58] Field of Search ......................................... 310/323, 328

[56] References Cited

U.S. PATENT DOCUMENTS

| | | | |
|---|---|---|---|
| 3,902,084 | 8/1975 | May | 310/328 |
| 4,468,583 | 8/1984 | Mori | 310/328 |
| 4,874,979 | 10/1989 | Rapp | 310/328 |
| 4,894,579 | 1/1990 | Higuchi et al. | 310/328 |
| 5,027,027 | 6/1991 | Orbach | 310/328 |
| 5,043,621 | 8/1991 | Culp | 310/328 |
| 5,325,010 | 6/1994 | Besocke et al. | 310/328 |
| 5,424,597 | 6/1995 | Glöss et al. | 310/328 |
| 5,453,653 | 9/1995 | Zumeris | 310/323 |

FOREIGN PATENT DOCUMENTS

| | | | |
|---|---|---|---|
| 0592030 | 4/1994 | European Pat. Off. | 310/328 |
| 62-60482 | 3/1987 | Japan | 310/328 |
| 0249480 | 10/1988 | Japan | 310/323 |
| 3249480 | 10/1988 | Japan | 310/323 |
| 5328753 | 12/1993 | Japan | 310/328 |

*Primary Examiner*—Thomas M. Dougherty

[57] ABSTRACT

A movement device, which moves an object with high accuracy and with little effect or wear on frictional surfaces. A first pair of piezoelectric elements are fixed to a base such that they expand and contact in a relative movement direction. A second pair of piezoelectric elements are fixed to the base such that they expand and contract in a direction perpendicular to the relative movement direction. A first vibrating body is connected to the first piezoelectric elements. A second vibrating body is positioned such that it does not contact the first vibrating body and moves in a predetermined direction relative to the base when the second vibrating body and the object lose contact. The second vibrating body and the object come in contact, and the first vibrating body and the object lose contact when the vibrating body moves in an opposite direction to the predetermined direction.

8 Claims, 10 Drawing Sheets

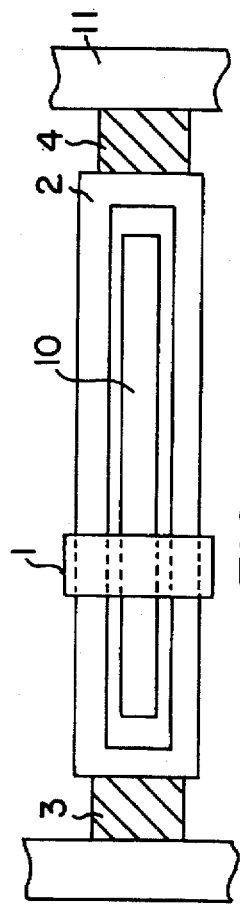
FIG. Ia
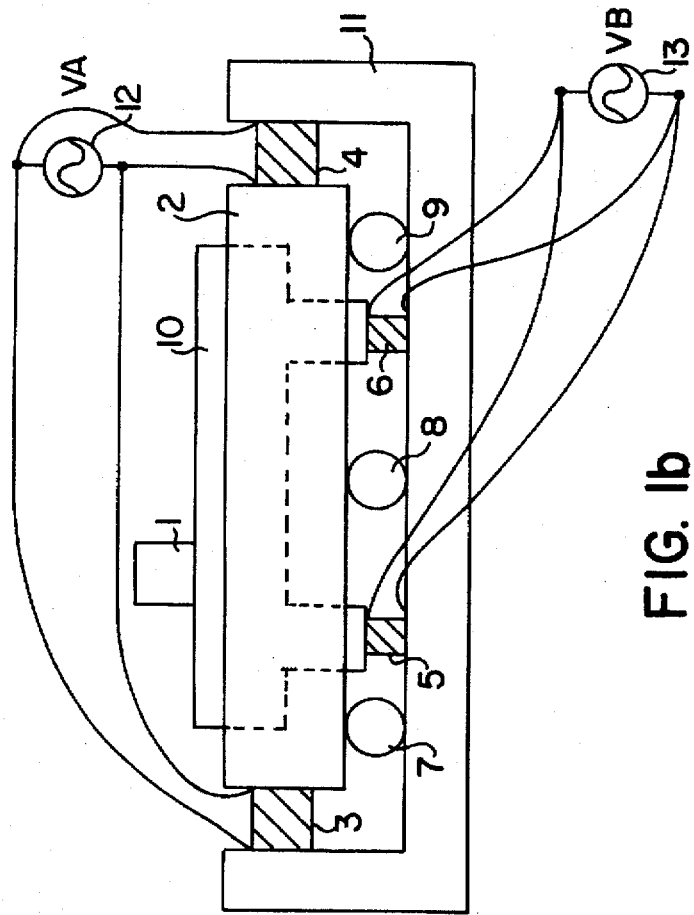
FIG. Ib

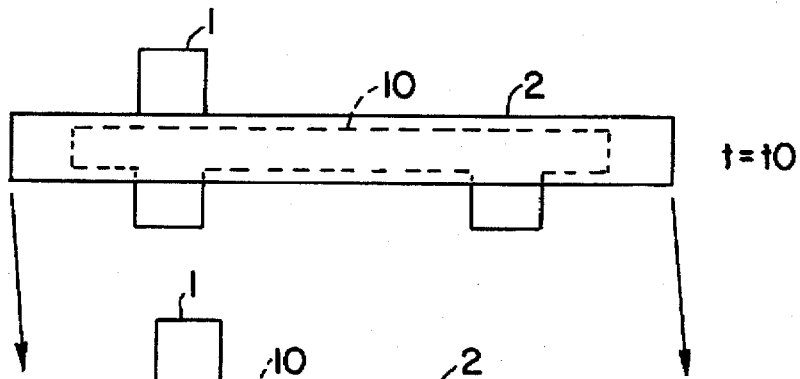
FIG. 3a  t=t0
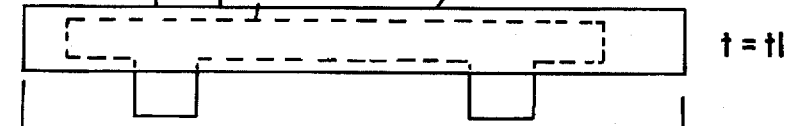
FIG. 3b  t=t1
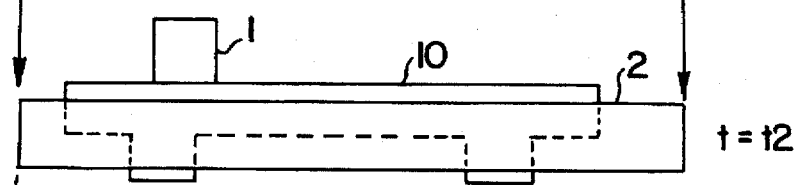
FIG. 3c  t=t2
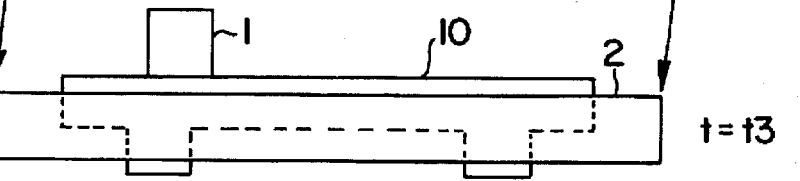
FIG. 3d  t=t3
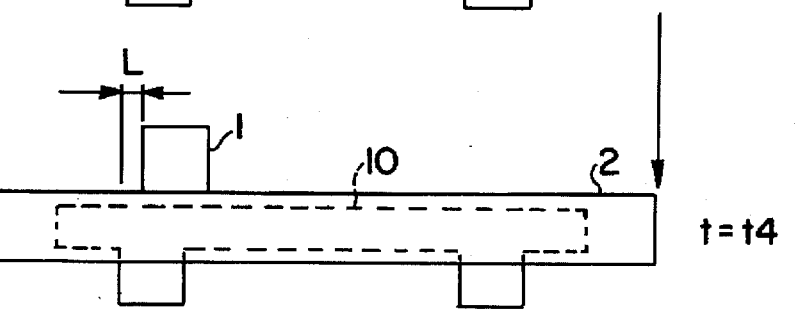
FIG. 3e  t=t4 t=0 t=t1 t=t2 t=t3 t=t4 t=t5

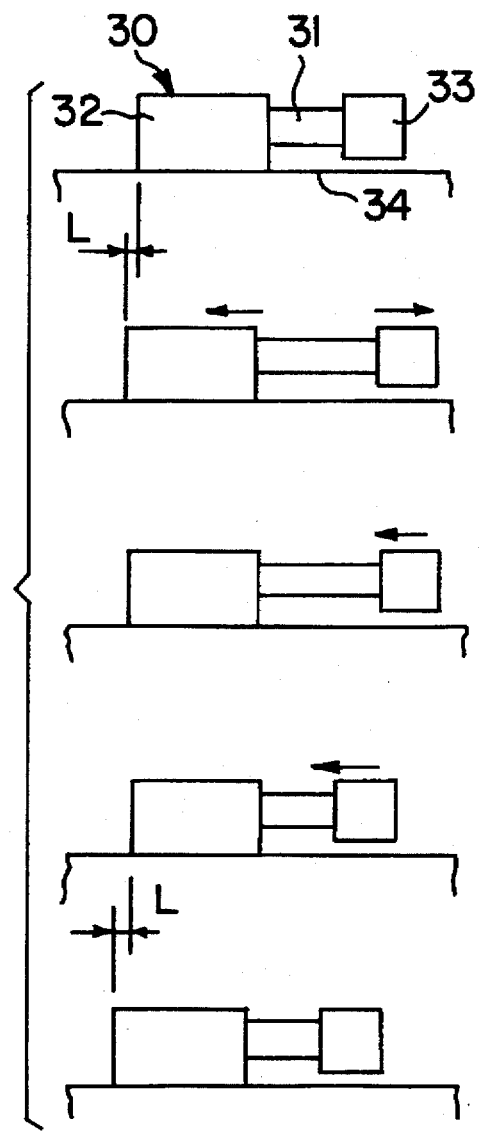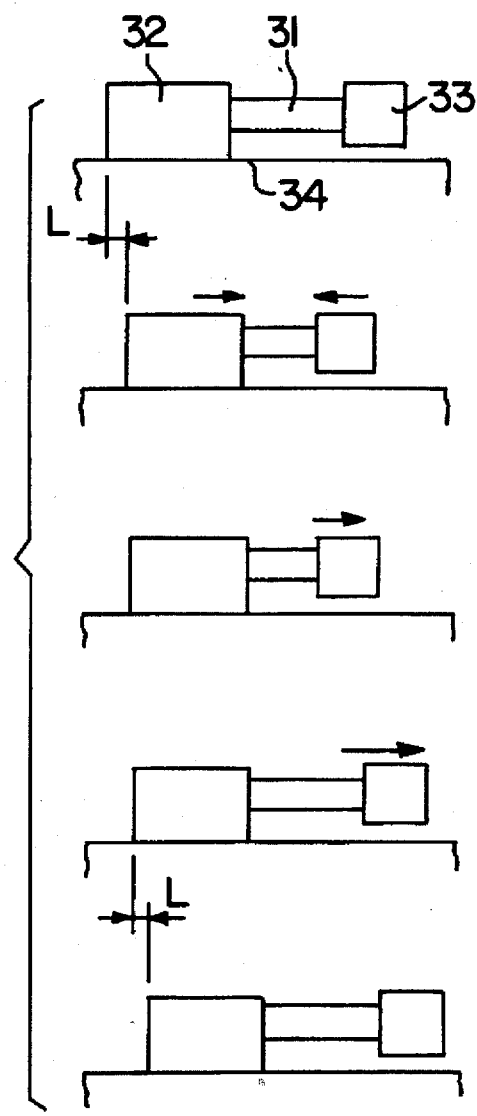
FIG. 9a
PRIOR ART
FIG. 9b
PRIOR ART

MOVEMENT DEVICE UTILIZING ELECTROMECHANICAL CONVERSION ELEMENTS AND CONTROL METHOD THEREFORE

This application is a continuation of application Ser. No. 08/506,855, filed Jul. 25, 1995, now abandoned.

BACKGROUND OF THE INVENTION

1. Field of the Invention

The present invention relates to a movement device, which causes movement of an object to be moved, using a vibrating body such as a piezoelectric element.

2. Description of the Related Art

Movement devices have heretofore been known in which movement of an object is caused by applying a high frequency voltage to a piezoelectric element, thereby causing an expansion and contraction of the piezoelectric element. The expansion and contraction is used to move the object.

FIGS. 9a and 9b are diagrams showing a known impact type device which is an example of a movement device. The movement device 30 is comprised by a moving body 32 and an object 33, both connected to a piezoelectric element 31. The moving body 32 is located on a fixed surface 34. The object 33 is not in contact with the fixed surface 34.

In FIG. 9a, a voltage is applied so as to expand the piezoelectric body 31. At this time, as the voltage is suddenly caused to change, the area of contact of the moving body 32 and the surface 34 enters a state of moving friction, causing the moving body 32 to move relative to the surface 34 (by a movement amount L). Next, a voltage is applied which causes the piezoelectric element 31 to contract. At this time, as the voltage is slowly changed, the area of contact of the moving body 32 and the surface 34 enter a state of static friction. Thus, the moving body 32 is stationary relative to the surface 34, and the body 33 approaches to the moving body 32. During a single cycle of expansion and contraction of the piezoelectric element 31, the moving body 32 is moved relative to the surface 34, by an amount L, to the left in FIG. 9a.

In FIG. 9b, when a voltage is initially applied, suddenly so as to contract the piezoelectric element 31, the moving body 32 moves, with respect to the surface 34, towards the right. Next, when a voltage is slowly applied so as to slowly expand the piezoelectric element 31, the moving body 32 is stationary with respect to the surface 34, and only the object 33 moves, in the direction of separation with respect to the moving body 32. The moving body 32 is caused to move by an amount L to the right in FIG. 9b.

FIG. 10 is a diagram showing a second example of a known movement device. A movement device 20 has an electrode 21a on one side of a piezoelectric element 21. The electrode 21a is fixed to a base 22, which is a fixed body. An electrode 21b on the opposite side of the piezoelectric element 21 is connected to a vibrating body 23. A support 24 is arranged in a rotatable state between the vibrating body 23 and the base 22. A voltage source 25 applies a voltage to the piezoelectric element 21, and is electrically connected to the electrodes 21a and 21b of the piezoelectric element 21. An object 26 is positioned on the vibrating body 23. The object 26 is moved by the movement device 20.

When a high frequency voltage is supplied from the voltage source 25 to the electrodes 21a and 21b of the piezoelectric element 21, the piezoelectric element 21 expands and contracts. Preferably, a voltage having an asymmetrical wave is supplied to the piezoelectric element 21. Initially, by the application of a voltage which changes rapidly so as to contract the piezoelectric element 21, the vibrating body 23 moves with a large acceleration towards the left in FIG. 10. As a result, the vibrating body 23 and the object 26 enter a state of moving friction, and the vibrating body 23 moves relative to the object 26. Next, the voltage is slowly changed to cause the expansion of the piezoelectric element 21. The vibrating body 23 moves with a small acceleration towards the right in FIG. 10. As a result, the vibrating body 23 and the object 26 enter a state of static friction, and the object 26 is stationary relative to the vibrating body 23. Thus, the object 26 moves to the right in FIG. 10 with respect to the vibrating body 23.

In the known movement devices 30 and 20, drive performance is greatly affected by the state of the friction surface. For example, if the surface is roughened, and if the roughness is large in comparison with the displacement (a few nm), the object cannot be caused to move. Moreover, when there is a variation in the friction coefficient of the friction surface, variation arises in the amount of displacement for each period, and setting or predicting the position of the object with any accuracy becomes impossible. Furthermore, using moving friction, the friction surface tends to deteriorate, the energy supplied from the drive source is lost due to the moving friction, causing the energy efficiency to become poor. Furthermore, a static friction state and a moving friction state have to be produced, such that the design of the drive circuit is complicated.

SUMMARY OF THE INVENTION

Accordingly, it is an object of the present invention to allow a highly precise movement of an object, while reducing the negative effects of the frictional surfaces.

Additional objects and advantages of the invention will be set forth in part in the description which follows, and, in part, will be obvious from the description, or may be learned by practice of the invention.

Objects of the present invention are achieved in a moving device comprising an electromechanical conversion element which expands and contracts with a supply of a voltage, a block connected to the electromechanical conversion element, an object which contacts the aforementioned block with a predetermined frictional force, a pair of first electromechanical conversion elements fixed to a body such that they expand and contract in a direction of relative movement, and a pair of second electromechanical conversion elements which have been fixed to the body such that they expand and contract with a direction component perpendicular to the direction of relative movement, a first block connected to each of the first electromechanical conversion elements, a second block located such that it is not in contact with the aforementioned first block and is connected to each of the second electromechanical conversion elements, a voltage supply unit for controlling the provision of the voltage to each of the second electromechanical conversion elements such that the object is caused to come in contact with the first block which enters a non-contact state with the object and the second block, the voltage supply unit supplying a voltage to each of the first electromechanical conversion elements such that the first block moves in a first direction relative to the object, the voltage supply unit supplying a voltage to each of the second electromechanical conversion elements such that the second block and the object come into contact and the first block and the object enter a non-contacting state, the voltage supply unit supplying a voltage to each of the first electromechanical conversion elements such that the first block moves, relative to the object, in a direction opposite to the first direction.

Objects of the present invention are also achieved in a moving device, as set forth above, wherein the voltage supply unit is constituted such that, when it supplies a voltage to the first electromechanical conversion elements, when the first block and the object are in contact, the area of contact between the first block and the object is maintained in a static frictional state.

Objects of the present invention are achieved in a moving device, as set forth above, wherein when the voltage supply unit supplies a voltage to the first electromechanical conversion elements when the first moving body and the object are in contact, the area of contact of the first block and the object is maintained in a moving frictional state, Objects of the present invention are also achieved in a moving device, as set forth above, wherein the voltage supply unit has a switch which selects a power supply unit which outputs a plurality of frequencies of the voltage to the first electromechanical conversion elements.

Objects of the present invention are also achieved in a method of moving an object comprising causing a pair of second electromechanical conversion elements of a movement device to expand and contract such that a first block and a second block are respectively mutually caused to contact the object, and a pair of first electromechanical conversion elements is caused to expand and contract such that, when the first block and the object are in contact, their contact surface is kept in a static frictional state, such that the first block is caused to move relatively in a first direction with respect to the object.

Objects of the present invention are also achieved in a method of moving an object comprising causing a pair of second electromechanical conversion elements of a movement device to expand and contract such that a first block and a second block are respectively mutually caused to contact the object, and a pair of first electromechanical conversion elements are caused to expand and contract such that, when the first block and the object are in contact, their contact surface is kept in a moving frictional state, such that the first block is caused to move relatively in a first direction with respect to the object, Objects of the present invention are also achieved in a method of moving an object comprising when a coarse movement is performed, causing a pair of second electromechanical conversion elements to expand and contract, such that a first block and a second block are respectively mutually in contact with the object, and a pair of first electromechanical conversion elements are caused to expand and contract such that, when the first block and the object are in contact their contact surface is kept in a moving frictional state, such that the first block is caused to move relatively in a coarse movement state in first direction relative to the object, and when performing a fine movement, causing the second electromechanical conversion elements to expand and contract, such that the first block and the second block are respectively mutually caused to contact the object, and the first electromechanical conversion elements are caused to expand and contract such that, when the first block and the object are in contact, their contact surface is kept in a static frictional state, such that the first block is caused to move relatively in a fine motion state in the first direction relative to the body.

Objects of the present invention are also achieved by a movement device for moving an object relative to the movement device comprising a body, at least one first electromechanical conversion element, fixed to the body, which expands and contracts in a direction of relative movement, at least one second electromechanical conversion element, fixed to the body, which expands and contracts in a direction approximately perpendicular to the direction of relative movement, a first block connected to the at least one first electromechanical conversion elements, a second block, spaced from the first block, connected to the at least one second electromechanical conversion element, and a voltage supply unit which supplies a voltage to the at least one second electromechanical conversion element such that the object comes in contact with the first block and separates the object from the second block, and thereafter supplies a voltage to the at least one electromechanical conversion element such that the first block moves in a first direction relative to the object, and thereafter supplies a voltage to the at least one second electromechanical conversion element such that the second block and the object come into contact and the first block and the object become spaced apart, and thereafter supplies a voltage to the at least one first electromechanical conversion element such that the first block moves in a direction opposite to the first direction relative to the object.

Objects of the present invention are further achieved by a method of moving an object in a specified direction comprising applying a voltage to a first element so as to vibrate the first element in a first direction approximately parallel with the specified direction, applying a voltage to a second element so as to vibrate the second element in a second direction perpendicular to the first direction without contacting the first element, and synchronizing the vibration of the first element with the second element such that when the first element is moving in the specified direction the first element is in contact with the object and when the first element is moving opposite to the specified direction the second element moves the object away from the first element.

Objects of the present invention are also achieved by a movement device comprising a first actuator which uses impact produced by at least one first electromechanical conversion element to vibrate in a first direction and a second actuator, spaced from the first actuator, which uses impact produced by at least one second electromechanical conversion element to vibrate in a second direction approximately perpendicular to the first direction, the second actuator vibrating in synchronization with the first actuator.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1a is a plan view of a movement device in accordance with a first preferred embodiment of the present invention.

FIG. 1b is a front view of a movement device in accordance with a first preferred embodiment of the present invention.

FIG. 3 is a schematic diagram showing stages of the operation of the movement device illustrated in FIG. 1.

FIGS. 9a and 9b are diagrams showing the operation of a known impact device.

DESCRIPTION OF THE PREFERRED EMBODIMENTS

Figure 2:
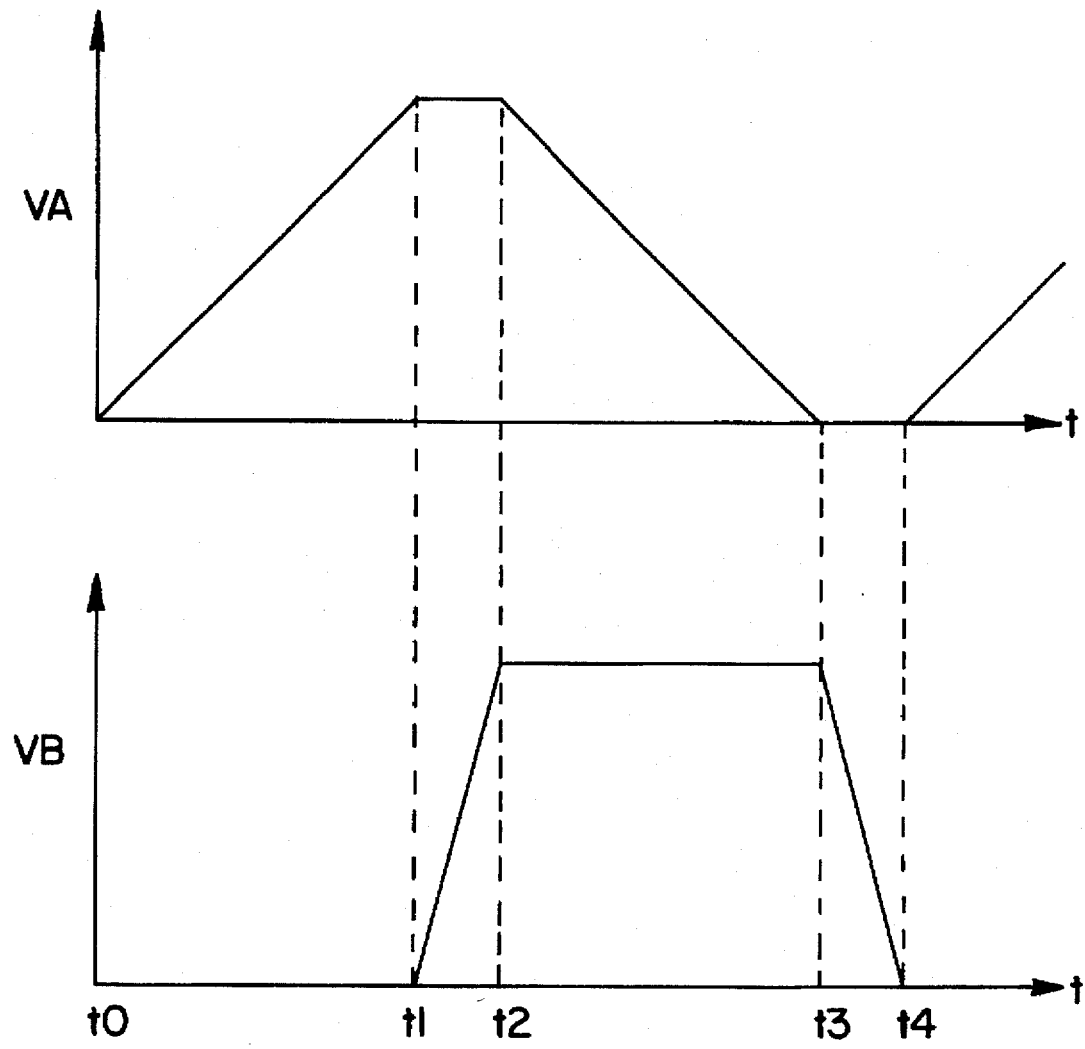
FIG. 2 is a graph showing a relationship between time and voltages VA and VB.

Reference will now be made in detail to the present preferred embodiments of the present invention, examples of which are illustrated in the accompanying drawings, wherein like reference numerals refer to like elements throughout.

FIGS. 1a and 1b are diagrams showing a movement device in accordance with a first embodiment of the present invention. FIG. 1a is a plan view, and FIG. 1b is a front view. A first block 2 and a base 11 are connected by a pair of piezoelectric elements 3 and 4. The piezoelectric elements 3 and 4 are mounted to expand and contract in a right and left direction, as seen in FIG. 1b. A plurality of supports 7, 8 and 9, comprising for example, ball bearings, are positioned between the first block 2 and the base 11. The supports 7, 8 and 9 are respectively positioned so as to have a free rotating motion.

The first block 2, as shown in FIG. 1a, has an approximately rectangular frame. A second block 10 is positioned inside the first block 2, without contacting with the first block 2. The second block 10 and the base 11 are connected by a pair of piezoelectric elements 5 and 6. The piezoelectric element 5 and 6 are mounted such that they expand and contract in the up and down direction, as seen in FIG. 1b.

A voltage supply 12 supplies voltage to the piezoelectric elements 3 and 4, causing the piezoelectric elements 3 and 4 to expand and contract. Moreover, a voltage supply 13 supplies voltage to the piezoelectric elements 5 and 6 causing the piezoelectric elements 5 and 6 to expand and contract.

A moving body 1 (or object) is positioned in the upper parts of the first block 2 and the second block 10. The surface of the moving body 1 contacts the first block 2 with a predetermined frictional force. When voltage is not supplied to any of the piezoelectric elements 3, 4, 5 or 6, the upper surface of the first block 2 is positioned lower than the upper surface of the second block 10, as shown in FIG. 1b.

FIG. 2 is a graph showing a relationship between times t1 to t4 and a voltage VA, supplied to the piezoelectric elements 3 and 4 by the voltage source 12, and a voltage VB supplied to the piezoelectric elements 5 and 6 by the voltage source 13. Moreover, FIG. 3 is a schematic diagram showing the stages of the operation of the movement device, illustrated in FIG. 1, at times t0 to t4.

In FIG. 2, the voltage source 12 supplies a voltage VA to the piezoelectric elements 3 and 4 between the times t0 and t1. During this time, the supplied voltage VA slowly increases. The voltage source 13 does not supply a voltage between times t0 and t1. Because of this, in the interval between t0 and t1, the second block 10 does not move. At this time, the upper surface of the second moving body 10 is below the upper surface of the first block 2. Accordingly, the moving body 1 is in contact with the first block 2. See FIG. 3 at t=t0. Then, as the piezoelectric elements 3 and 4 expand and contract, and the block 2 moves to the left. At this time, because the voltage VA is slowly changed, the area of contact between the moving body 1 and the first block 2 is maintained in a static friction state. As a result, the moving body 1 moves together with the first block 2. See FIG. 3 at t=t1.

Next, in the interval between t1 and t2, the voltage source 12 supplies a constant voltage VA to the piezoelectric elements 3 and 4. Moreover, the voltage source 13 supplies a rapidly increasing voltage VB to the piezoelectric elements 5 and 6. Accordingly, the piezoelectric elements 3 and 4, in the interval from t0 to t1 maintain their expanded, or contracted, state. Moreover, the piezoelectric elements 5 and 6, supplied with a voltage from the voltage source 13, expand upwards causing the second block 10 to come into contact with the moving body 1. Then, expanding further upwards, the moving body 1 is lifted off the first block 2, and the contact between the moving body 1 and the first block 2 is lost. As a result, the moving body 1 makes contact solely with the second block 10. See FIG. 3 at t=t2. Moreover, the amount of expansion of the piezoelectric elements 5 and 6, at the instant t2, is set beforehand such that, the expansion becomes larger than the difference between the upper surface of the first block 2 and the upper surface of the second block 10 at time t=t0 in FIG. 3.

Next, in the interval from t2 to t3, the voltage source 12 supplies a gradually decreasing voltage VA to the piezoelectric elements 3 and 4 (the supplied voltage becomes 0 at t3). Moreover, the voltage source 13 supplies a constant voltage VB to the piezoelectric elements 5 and 6 during this interval. Due to this, the piezoelectric elements 3 and 4 return to the state before expansion and contraction, i.e. their start positions at t0. Namely, the first block 2 returns to its initial position, but having no contact with the moving body 1. See FIG. 3 at t=t3.

In the next interval, from t3 to t4, the voltage source 12 does not supply a voltage to the piezoelectric elements 3 and 4. The voltage source 13 supplies a suddenly decreasing voltage VB to the piezoelectric element 5 and 6 (the supplied voltage becomes 0 at t4). The piezoelectric element 5 and 6 return to their state before the expansion and contraction. Accordingly, the contact between the moving body 1 and the second block 10 is released, and the moving body 1 again contacts the first block 2. See FIG. 3 at t=t4.

Thus, from the interval t0 to t4, the moving body 1 is moved by an amount L to the right. See FIG. 3 at t=t4. Consequently, by repeating the above operation, the moving body 1 can be caused to move in a predetermined direction.

Although the first embodiment of the present invention has been described with respect to a specific configuration, it will be recognized that the first embodiment is not limited to the specific configuration. For example, while piezoelectric elements 3, 4, 5 and 6 are used as electromechanical conversion elements in the embodiment examples, electromechanical conversion elements such as electrostriction elements may be used. Moreover, where the case that the weight of the moving body 1 is large, or if the moving body 1 is compressed, mechanisms which exert stronger forces are desirable.

Figure 4:
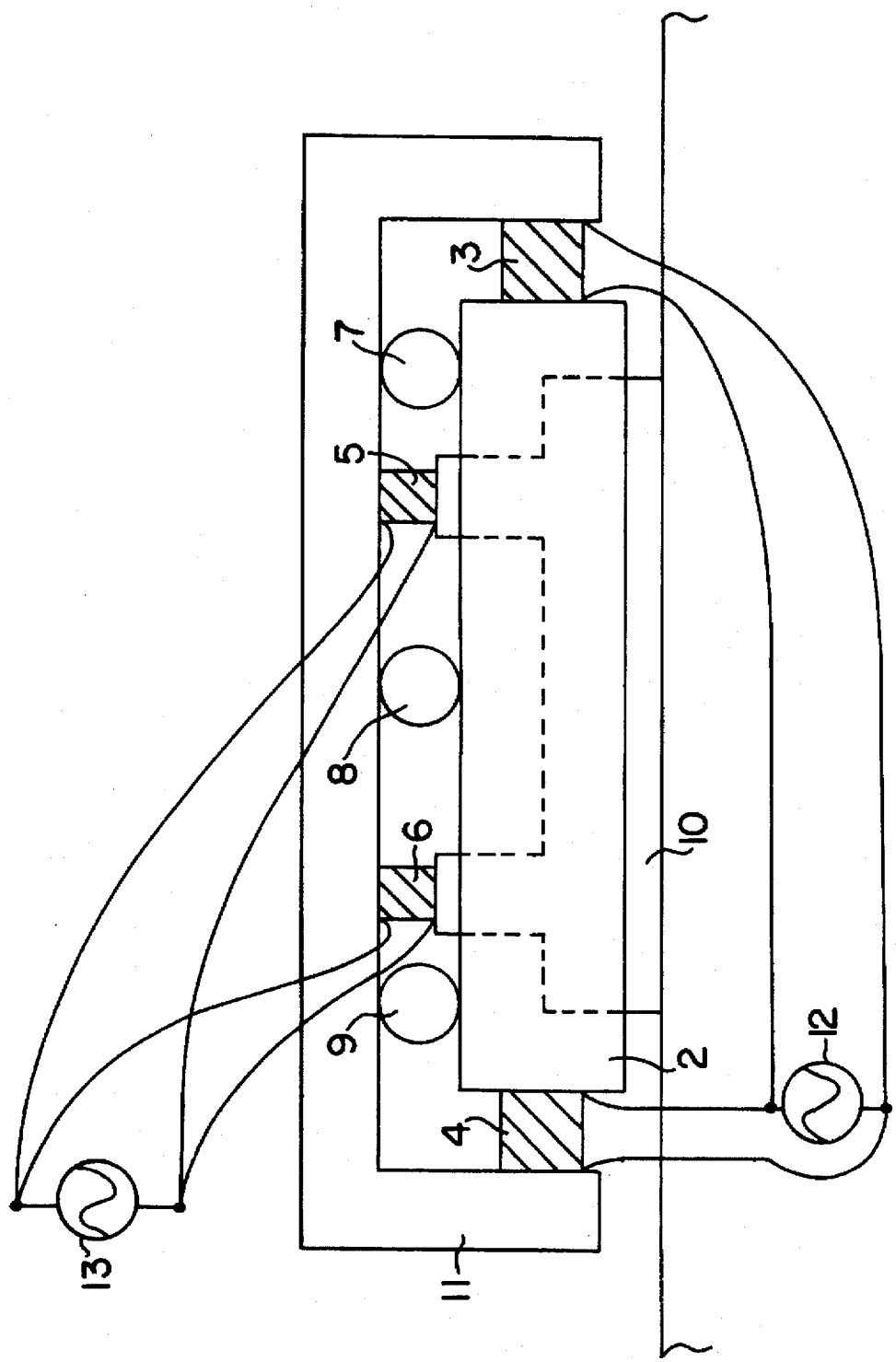
FIG. 4 is a diagram of a movement device in accordance with a second preferred embodiment of the present invention.
Figure 5A:
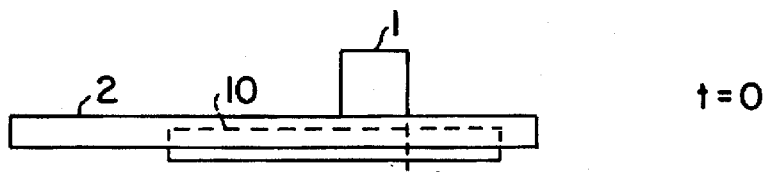
FIG. 5 is a diagram showing a movement device in accordance with a third preferred embodiment of the present invention.
Figure 5B:
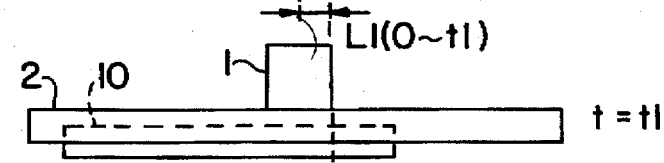
Figure 5C:
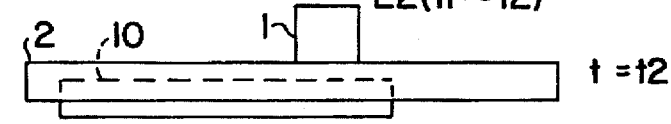
Figure 5D:
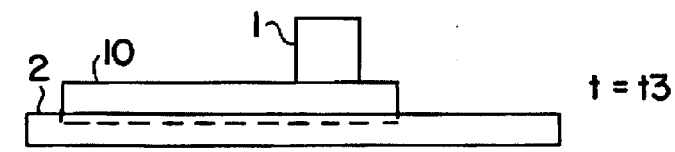
Figure 5E:
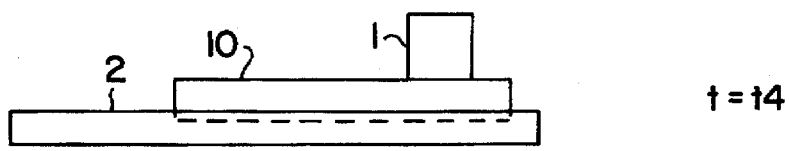
Figure 5F:
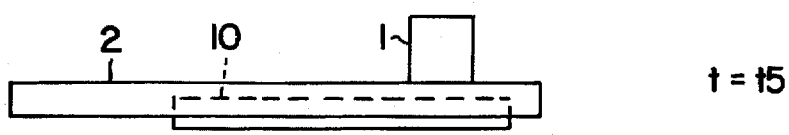

FIG. 4 is a diagram of a movement device in accordance with a second preferred embodiment of the present invention. The movement device in accordance with the second preferred embodiment, is a self-propelled form of the movement device in accordance with the first preferred embodiment.

In accordance with the second preferred embodiment, initially the voltage source 12 supplies voltage to the piezoelectric elements 3 and 4, so as to maintain the first block 2 and a movement surface S in a state of static friction. At this time, the second block 10 is not in contact with the movement surface S. The first block 2 and the movement surface S move relative to one another. However, the base 11 moves with respect to the first block 2.

Next, the voltage source 13 supplies a voltage to the piezoelectric elements 5 and 6. Due to this, the second block 10 comes into contact with the movement surface S. Furthermore, when the piezoelectric elements 5 and 6 expand, the first block 2 is lifted up from the movement surface S and the first block 2 is released from contact with the movement surface S. As a result, the movement surface S is only in contact with the second block 10 (the state shown in FIG. 4). In this state, when the voltage supplied to the piezoelectric elements 3 and 4 is decreased, the first block 2 moves relative to the base 11. Then, when the voltage supplied to the piezoelectric elements 5 and 6 decreases, the movement surface S and the first block 2 reestablish contact. By means of the above operation, the whole movement device moves with respect to the movement surface S.

Although the second embodiment of the present invention has been described with respect to a specific configuration, it will be recognized that the second embodiment is not limited to the specific configuration. For example, while piezoelectric elements 3, 4, 5 and 6 are used as electromechanical conversion elements in the embodiment examples, electromechanical conversion elements such as electrostriction elements may be used. Moreover, where the case that the weight of the moving body 1 is large, or if the moving body 1 is compressed, mechanisms which exert stronger forces are desirable.

FIG. 5 is a diagram showing a movement device in accordance with a third embodiment of the present invention. In accordance with the third preferred embodiment, the movement device is similar to the movement device of FIG. 1, but the moving body 1 is driven by moving friction. In FIG. 5, the elements having no direct connection to the movement operation are omitted for clarity; only the moving body 1, first block 2 and second block 10 are shown.

Between t=0 and t=t1, the first block 2 is moved to the right, at some predetermined acceleration a, by means of the piezoelectric elements 3 and 4, where a>μg (wherein: μ0 is the coefficient of static friction between the contact surface of the first block 2 and the moving body 1; and g is the acceleration due to gravity). The moving body 1 is equally accelerated by a moving frictional force μ' mg (wherein: μ' is the coefficient of moving friction; and m is the mass of the moving body 1). The direction of movement $L1=\mu' gt1^2/2$ is to the right.

At t=t1, when the voltage VA supplied to the piezoelectric elements 3 and 4 becomes constant, the movement of the first block 2 stops. At this time, the moving body 1 has a velocity v=μ' gt1. Then, the moving body 1, due to the moving friction with the first block 2, stops at the t=t2 (the movement amount $L2=\mu' g(t2-t1)^2/2$).

From t=t2 to t=t3, the second block 10 is moved upward by the piezoelectric elements 5 and 6, see FIG. 1. As a result, the moving body 1 loses contact with the first block 2.

Between t=t3 and t=t4, the first block 2 is moved to the left by the piezoelectric elements 3 and 4.

Between t=t4 and t=t5, the second block 10 is returned to the original position by the piezoelectric elements 5 and 6. As a result, the moving body 1 reestablishes contact with the first block 2. Thus, from t=t0 to t=t5, the moving body 1 is moved by an amount of movement L1+L2.

Although the third embodiment of the present invention has been described with respect to a specific configuration, it will be recognized that the third embodiment is not limited to the specific configuration. For example, while piezoelectric elements 3, 4, 5 and 6 are used as electromechanical conversion elements in the embodiment examples, electromechanical conversion elements such as electrostriction elements may be used. Moreover, where the case that the weight of the moving body 1 is large, or if the moving body 1 is compressed, mechanisms which exert stronger forces are desirable.

Figure 6:
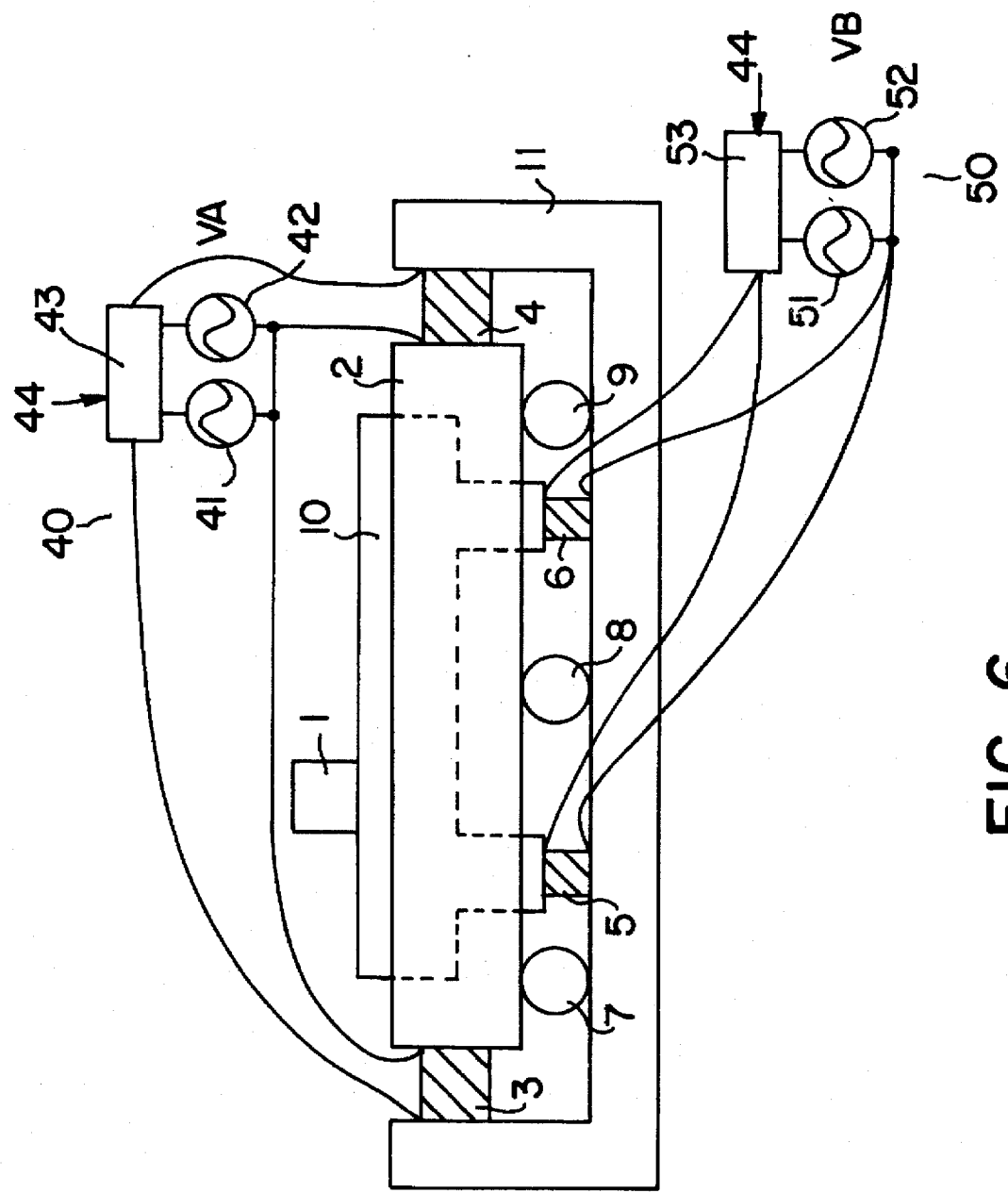
FIG. 6 is a diagram showing a movement device in accordance with a fourth preferred embodiment of the present invention.

FIG. 6 is a diagram showing a movement device in accordance with a fourth preferred embodiment of the present invention. In accordance with the fourth preferred embodiment, the movement device can move, interchanging between a moving friction drive and a static friction drive. The changeover between moving friction drive and static friction drive is performed by changing the frequency of the voltage applied to the piezoelectric elements. A voltage supply unit 40 supplies a voltage to the piezoelectric elements 3 and 4. Moreover, a voltage supply unit 50 supplies a voltage to the piezoelectric elements 5 and 6. The voltage supply unit 40 is equipped with a high frequency oscillator 41, a low frequency oscillator 42, and a switch 43 to change over between the two oscillators 41 and 42. The switch 43 inputs a control signal 44 which selects between moving friction drive or static friction drive, and supplies the appropriate voltage, output either by the high frequency oscillator 41 or by the low frequency oscillator 42, to the piezoelectric elements 3 and 4. Moreover, the voltage supply unit 50 is equipped with a switch 53 to select between a high frequency oscillator 51 and a low frequency oscillator 52. The switch 53, similar to a switch 43, inputs the control signal 44 which, in effect, selects moving friction drive or static friction drive. The switch 43 supplies one of the voltages output from the high frequency oscillator 51 or the low frequency oscillator 52 to the piezoelectric elements 5 and 6. Thus, the moving device is driven in a moving frictional state when the frequency of the applied voltage becomes high. Moreover, the moving device is driven in a static frictional state when the frequency becomes low. Accordingly, a combination of a high speed movement, using moving friction in a low speed movement, using static friction is possible, allowing an accurate, stable movement of the moving body 1.

Although the fourth embodiment of the present invention has been described with respect to a specific configuration, it will be recognized that the fourth embodiment is not limited to the specific configuration. For example, it is not necessary to provide separate oscillators for high frequency use and low frequency use, one oscillator may be used to supply both frequencies by changing over between two kinds of voltage in response to the control signal. Moreover, the changeover may be made manually.

Figure 7A:
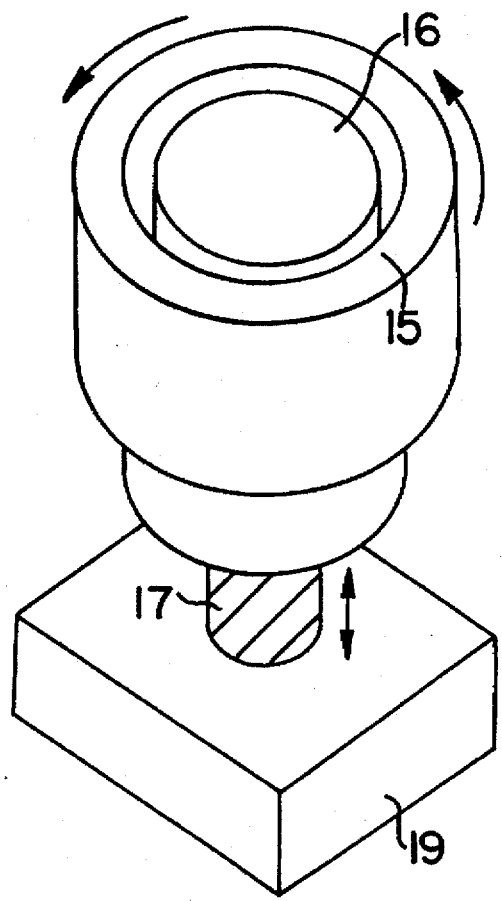
FIG. 7a is a perspective view of a cylindrical movement device in accordance with a fifth preferred embodiment of the present invention.
Figure 7B:
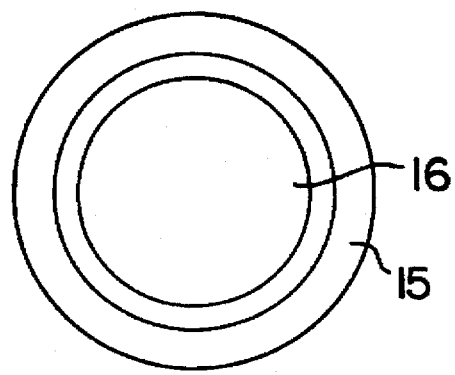
FIG. 7b is a top view of a cylindrical movement device in accordance with the fifth preferred embodiment of the present invention.
Figure 8A:
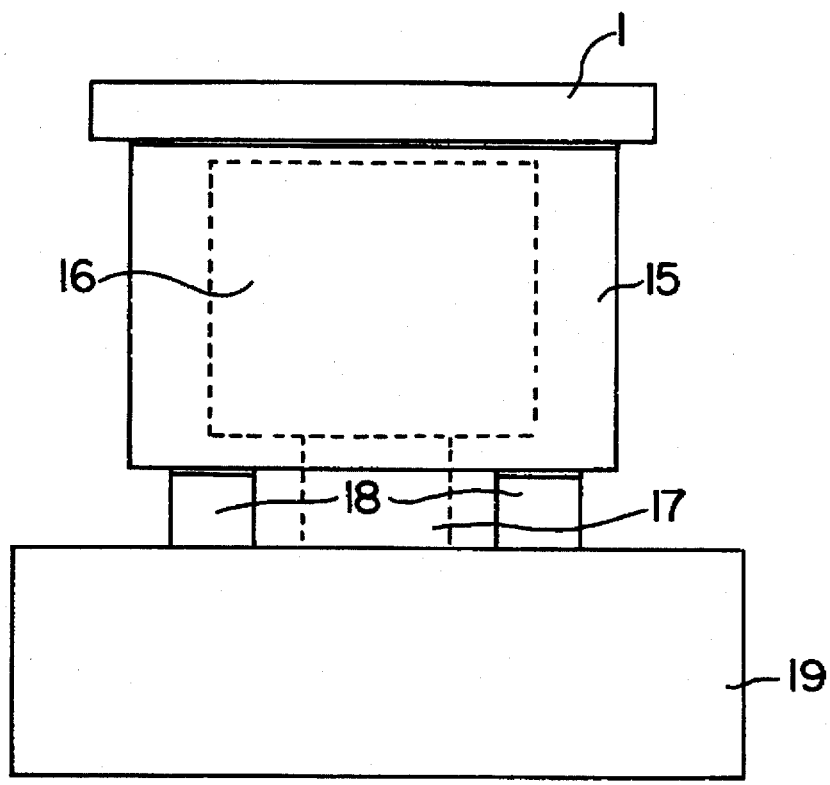
FIG. 8a is a side view of a cylindrical movement device in accordance with the fifth preferred embodiment of the present invention.
Figure 8B:
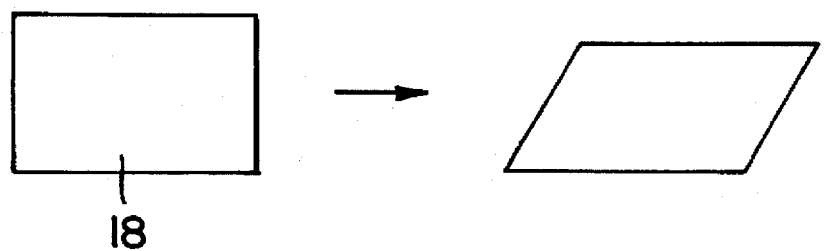
FIG. 8b is a diagram of a piezoelectric element for use with the cylindrical movement device in accordance with the fifth preferred embodiment of the present invention.
Figure 10:
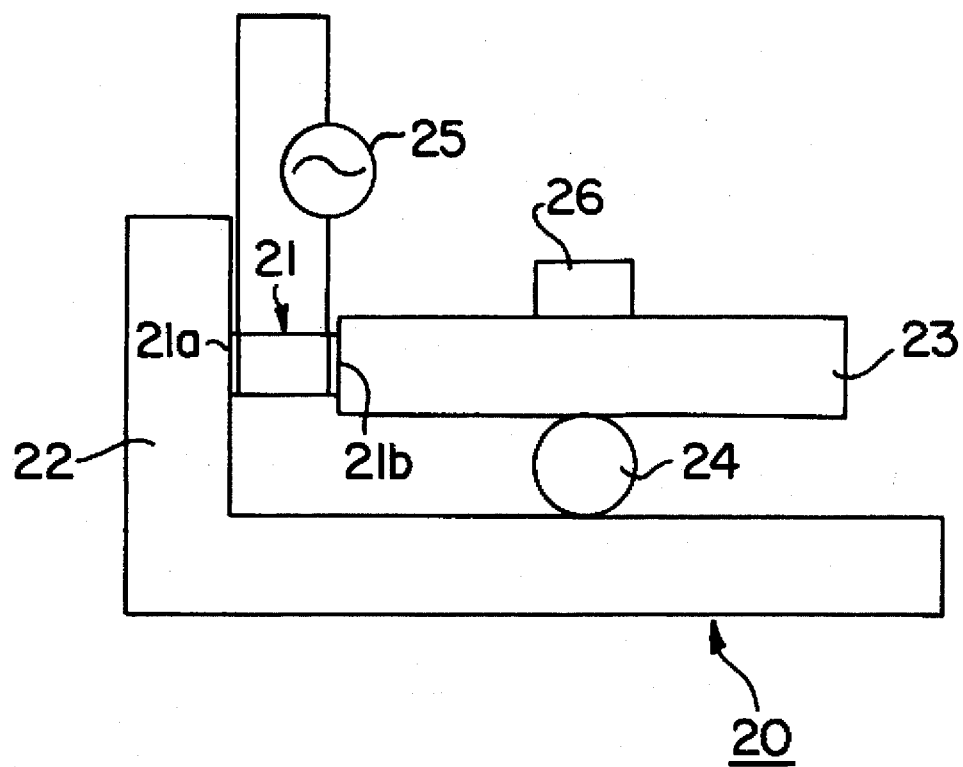
FIG. 10 is a diagram showing a known movement device.

FIGS. 7a and 7b are diagrams showing a movement device in accordance with a fifth preferred embodiment of the present invention. The movement device, in accordance with the fifth preferred embodiment of the present invention is configured as a cylindrical movement device. FIG. 7a is a perspective view while FIG. 7b is a top view. Moreover, FIG. 8a is a side view of the movement device in accordance with the fifth preferred embodiment of the present invention. FIG. 8b is a diagram representing the configurational state of the piezoelectric element 18 in accordance with the fifth preferred embodiment of the present invention. The piezoelectric element 18 is omitted from FIG. 7a.

An outer tube 15 is formed with a hollow cylindrical shape. An inner tube 16 is located within the interior of the outer tube 15, without contacting with the outer tube 15. A pair of piezoelectric elements 18 preferably comprise a d15 mode piezo element. When a predetermined voltage is supplied, the piezoelectric element deforms, as shown in FIG. 8b. A piezoelectric element 17 is located at the bottom of the inner tube 16. The piezoelectric element 17 expands in the up and down direction when a predetermined voltage is supplied. The movement device is connected to a base 19 via the piezoelectric elements 18. The moving body 1 is located on the upper surface of the outer tube 15.

In accordance with the fifth preferred embodiment, when voltages are initially supplied to the piezoelectric elements 18, each piezoelectric element 18 is deformed as shown in FIG. 8b, and the outer tube 15, along with the object 1, moves rotationally. Next, by supplying a voltage to the piezoelectric element 17, the piezoelectric element 17 expands, and the inner tube 16 and the object 1 come into contact. The outer tube 15 separates from the object 1. In this state, when the voltage supplied to the piezoelectric elements 18 is decreased, the piezoelectric elements 18 return to their original state. After this, when the voltage supplied to the piezoelectric element 17 is decreased, the outer tube 15 and the object 1 reestablish contact. Thus, a rotational motion of the object 1 is performed.

Although the fifth embodiment of the present invention has been described with respect to a specific configuration, it will be recognized that the fifth embodiment is not limited to the specific configuration.

Although a few preferred embodiment of the present invention have been shown and described, it would be appreciated by those skilled in the art that changes may be made in these embodiments without departing from the principles and spirit of the invention, the scope of which is defined in the claims and their equivalents.

In accordance with the preferred embodiments of the present invention, a relative movement of an object is caused using a first block and a second block. Because the first block may be moved to return without contacting the object, the effect and wear on the contact surface is minimal. Moreover, if a static frictional state is maintained between the first block and the object, variations in the roughness between the frictional surfaces, or variations in the coefficient of moving friction, do not exert an effect on the drive step, relative movement can be achieved with increased precision. Moreover, deterioration and wear of the frictional surfaces can be prevented. Furthermore, because no work is performed in static friction (the amount of movement is zero), the energy supplied from the drive source is not lost, and energy efficiency is high. Furthermore, a simplified design of the drive circuits which apply voltage to the piezoelectric elements is achieved.

If the first block and the object are moved relatively in a moving frictional state, the drive voltage can be caused to suddenly change, the period can be shortened, and the number of drive cycles per unit time can be increased. Accordingly, the speed of movement is faster. Moreover, the amount of relative movement per cycle is large.

Moreover, when the first block and the object are in contact, the first electromechanical conversion elements may be caused to expand and contract such that their contact surface maintains a static frictional state. Consequently, because there is no moving friction when they move mutually, it is possible to cause a relative movement with increased precision without the effects of moving friction. Moveover, when the first block and the object are in contact, the first electromechanical conversion elements may be caused to expand and contract such that the contact surface of the two is kept in a moving frictional state. Consequently, the relative motion per cycle is large, and the period is short.

What is claimed is:

1. A movement device for moving an object relative to the movement device comprising:

a body;

at least one first electromechanical conversion element, fixed to said body, which expands and contracts in a direction of relative movement;

at least one second electromechanical conversion element, fixed to said body, which expands and contracts in a direction approximately perpendicular to the direction of relative movement;

a first block connected to said at least one first electromechanical conversion element;

a second block, spaced from and separate from said first block, connected to said at least one second electromechanical conversion element; and a voltage supply unit which supplies a voltage to said at least one second electromechanical conversion element such that the object comes in contact with said first block and separates the object from said second block, and thereafter supplies a voltage to said at least one first electromechanical conversion element such that said first block moves in a first direction relative to the object, and thereafter supplies a voltage to said at least one second electromechanical conversion element such that said second block and the object come into contact and said first block and the object become spaced apart, and thereafter supplies a voltage to the at least one first electromechanical conversion element such that said first block moves in a direction opposite to the first direction relative to the object.

2. A movement device according to claim 1, wherein when said voltage supply unit supplies a voltage to said at least one first electromechanical conversion element, when said first block and said object are in contact, a contact surface between said first block and said object is kept in a static frictional state.

3. A movement device according to claim 1, wherein when said voltage supply unit supplies a voltage to said at least one first electromechanical conversion element when said first block and said object are in contact, a contact surface between said first block and said object is kept in a moving frictional state.

4. A movement device according to claim 1 further comprising:

a power supply unit which provides a plurality of voltage outputs to said at least one first electromechanical conversion element and said at least one second electromechanical conversion element; and a switch which selects a voltage output to said at least one first electromechanical conversion element from said power supply unit.

5. A movement device according to claim 4, wherein the plurality of voltage outputs differ by frequency.

6. A movement device according to claim 4, wherein said plurality of voltages comprise:

a first voltage such that when said first block and said object are in contact, a contact surface between said first block and said object is kept in a static frictional state; and a second voltage such that when said first block and said object are in contact, a contact surface between said first block and said object is kept in a moving frictional state.

7. A movement device for moving an object relative to the movement device comprising:

a body;

a first block;

a second block spaced from and separate from said first block;

a first electro-mechanical conversion element, fixed between said body and said first block which expands and contracts in accordance with an applied voltage so as to move said first block back and forth along a movement path;

a second electro-mechanical conversion element connecting said body and said second block which expands forcing said second block into contact with the object and separating the object from the first block and contracts so as to deposit the object onto said first block, thereby separating said second block from said object; and a voltage supply unit which supplies voltage to said first and second electro-mechanical conversion elements so as to cause said first electro-mechanical conversion element to expand while said second electro-mechanical conversion element is contracted and to cause said first electro-mechanical element to contract when said second electro-mechanical conversion element is expanded, thereby to move said object in a first movement direction.

8. A movement device according to claim 7, further comprising:

the voltage supply unit provides a first and second voltage output; and a switch which selects one of the first and second voltage output to apply to said first electro-mechanical conversion element; wherein the first voltage causes a contact surface between said first block and said object to be kept in a static frictional state when said first block and said object are in contact; and the second voltage causes the contact surface between said first block and said object to be kept in a moving frictional state when said first block and said object are in contact.

* * * * *